US 11,449,683 B2

(12) United States Patent
Silverstein et al.

(10) Patent No.: US 11,449,683 B2
(45) Date of Patent: Sep. 20, 2022

(54) DISENTANGLEMENT OF CHAT UTTERANCES

(71) Applicant: International Business Machines Corporation, Armonk, NY (US)

(72) Inventors: Zachary A. Silverstein, Austin, TX (US); Kelley Anders, East New Market, MD (US); Jonathan D. Dunne, Dungarvan (IE); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 17/103,038

(22) Filed: Nov. 24, 2020

(65) Prior Publication Data

US 2022/0164542 A1    May 26, 2022

(51) Int. Cl.
*G06F 40/35* (2020.01)
*G06F 40/169* (2020.01)
(Continued)

(52) U.S. Cl.
CPC ............ *G06F 40/35* (2020.01); *G06F 40/169* (2020.01); *G06F 40/279* (2020.01); *H04L 51/04* (2013.01)

(58) Field of Classification Search
CPC ...... G06F 40/35; G06F 40/169; G06F 40/279; H04L 51/04
See application file for complete search history.

(56) References Cited

U.S. PATENT DOCUMENTS

| 6,346,952 B1 | 2/2002 | Shtivelman |
| 7,039,677 B2 | 5/2006 | Fitzpatrick et al. |

(Continued)

FOREIGN PATENT DOCUMENTS

| CN | 104113470 A | 10/2014 |
| KR | 101960115 B1 | 3/2019 |

OTHER PUBLICATIONS

Mehri et al., "Chat Disentanglement: Identifying Semantic Reply Relationships with Random Forests and Recurrent Neural Networks," Proceedings of the The 8th International Joint Conference on Natural Language Processing, Taipei, Taiwan, Nov. 27-Dec. 1, 2017, pp. 615-623.

(Continued)

*Primary Examiner* — Scott T Baderman
*Assistant Examiner* — Seung Woon Jung
(74) *Attorney, Agent, or Firm* — Yee & Associates, P.C.

(57) ABSTRACT

Disentanglement of chat utterances is provided. An analysis of the linguistic collocations and the keywords of the multiple chat utterances and amount of contribution by respective chat users of the plurality of chat users to the multiple chat utterances is performed to determine a level of drift of the linguistic collocations, the keywords, and respective chat users over a course of the multiple chat utterances. Chat utterance entanglement of prior chat utterances is determined using determined level of drift based on the analysis by inferring keyword usage over time and how these keywords are related over the course of the multiple chat utterances. The prior chat utterances related to a particular topic are disentangled by removing certain chat utterances that have a statistically significant level of drift from that particular topic. Removed chat utterances are arranged as a new chat discourse related to a different topic in the chat conversation.

18 Claims, 13 Drawing Sheets

(51) Int. Cl.
*G06F 40/279* (2020.01)
*H04L 51/04* (2022.01)

(56) References Cited

U.S. PATENT DOCUMENTS

| | | | |
|---|---|---|---|
| 7,281,022 | B2 | 10/2007 | Gruhl et al. |
| 7,328,242 | B1 | 2/2008 | McCarthy et al. |
| 7,779,079 | B2 | 8/2010 | Nichols et al. |
| 8,140,981 | B2 | 3/2012 | Gusler et al. |
| 8,543,654 | B2 | 9/2013 | Schindler et al. |
| 9,450,769 | B2 | 9/2016 | Wolff et al. |
| 9,929,994 | B2 | 3/2018 | Hamlin et al. |
| 10,366,168 | B2 | 7/2019 | Wu |
| 10,592,612 | B2 | 3/2020 | Bostick et al. |
| 2013/0218885 | A1 | 8/2013 | Satyanarayanan |
| 2019/0121868 | A1* | 4/2019 | Dunne ............... G06F 16/285 |
| 2019/0205743 | A1* | 7/2019 | Jiang ..................... G06N 3/08 |
| 2020/0057808 | A1 | 2/2020 | Dunne et al. |
| 2020/0076746 | A1 | 3/2020 | Penrose et al. |

OTHER PUBLICATIONS

Jiang et al., "Learning to Disentangle Interleaved Conversational Threads with a Siamese Hierarchical Network and Similarity Ranking," Proceedings of the 2018 Conference of the North American Chapter of the Association for Computational Linguistics: Human Language Technologies, vol. 1, New Orleans, Louisiana, Jun. 2018, 11 pages.

Elsner et al., "You talking to me? A Corpus and Algorithm for Conversation Disentanglement," Proceedings of the 46th Annual Meeting of the Association for Computational Linguistics, Jun. 15-20, 2008, Columbus, Ohio, pp. 834-842.

Elsner et al., "Disentangling Chat," Association for Computational Linguistics, 2010, 24 pages. hittps://www.mitpressjournals.org/doi/pdfplus/10.1162/coli_a_00003.

Kummerfeld et al., "A Large-Scale Corpus for Conversation Disentanglement," 57th Annual Meeting of the Association for Computational Linguistics (ACL), Florence, Italy, Jul. 28-Aug. 2, 2019, 11 pages.

Wallace, "Multiple Narrative Disentanglement: Unraveling Infinite Jest," 2012 Conference of the North American Chapter of the Association for Computational Linguistics: Human Language Technologies, Montreal, Canada, Jun. 3-8, 2012, 10 pages.

Wang et al., "Context-based Message Expansion for Disentanglement of Interleaved Text Conversations," 2009 Annual Conference of the North American Chapter of the Association for Computational Linguistics, Boulder, Colorado, Jun. 2009, pp. 200-208.

* cited by examiner

FIG. 6

CHAT UTTERANCE POSITION TABLE 600

| DATE CREATED | USER | | CHAT UTTERANCES | CHAT UTTERANCES POSITION | CHAT DISCOURSE ID |
|---|---|---|---|---|---|
| 10/1/2004 16:00:00 | 1 | 1 | USER 2: so if it's really not supposed to go into the archive, is that because it's debugging? in which case shouldn't it be -6unbuntu18.1? | START | 29 |
| 10/1/2004 16:00:00 | 1 | 1 | so that 19 is still new when it hits the street? | MIDDLE | 29 |
| 10/1/2004 16:01:00 | 2 | 2 | USER 1: i only need a driver out of it... yeah well the version concept is correct | MIDDLE | 29 |
| 10/1/2004 16:01:00 | 2 | 2 | USER 1: but nobody is using ubuntu19 | MIDDLE | 29 |
| 10/1/2004 16:01:00 | 2 | 2 | and traashing the debs | MIDDLE | 29 |
| 10/1/2004 16:01:00 | 2 | 2 | that's all i need atm | MIDDLE | 29 |
| 10/1/2004 16:02:00 | 2 | 2 | USER 1: do you think you can build ppc please? | MIDDLE | 29 |
| 10/1/2004 16:02:00 | 1 | 1 | email me a pointer to the sources, and I'll get it built | MIDDLE | 29 |
| 10/1/2004 16:02:00 | 2 | 2 | USER 1: people.nny.com/~fabbione | MIDDLE | 29 |
| 10/1/2004 16:02:00 | 1 | 1 | fwiw, you're less likely to get the ability to admin the chroot than you are to get... | MIDDLE | 29 |
| 10/1/2004 16:03:00 | 2 | 2 | USER 1: honestly.. i don't mind.. really.. i just don't want to spend half day... | MIDDLE | 29 |
| 10/1/2004 16:03:00 | 2 | 2 | USER 1: if someone can take care of updating the chroot once in a while it's... | MIDDLE | 29 |
| 10/1/2004 16:03:00 | 1 | 1 | 3.2 MB of DIFF??? sheesh | MIDDLE | 29 |
| 10/1/2004 16:16:00 | 2 | 2 | when i write "i am dealing to maintain the chroot" is only to remove extra work... | MIDDLE | 29 |
| 10/1/2004 16:16:00 | 2 | 2 | not because i want to look cool or because i feel privileged ;) | MIDDLE | 29 |
| 10/1/2004 16:04:00 | 3 | 3 | USER 4: is ~firefox a release goal now? | START | 30 |
| 10/1/2004 16:16:00 | 1 | 1 | heh | MIDDLE | 29 |
| 10/1/2004 16:16:00 | 1 | 1 | USER 2: just ppc, or do you need amd64 as well? | MIDDLE | 29 |
| 10/1/2004 16:05:00 | 4 | 4 | USER 3: yes | MIDDLE | 30 |
| 10/1/2004 16:05:00 | 2 | 2 | USER 1: only ppc | MIDDLE | 29 |
| 10/1/2004 16:05:00 | 2 | 2 | USER 1: Mithrandir did amd64 | MIDDLE | 29 |
| 10/1/2004 16:05:00 | 3 | 3 | USER 4: so i should be ok to integrate and upload PR1? | MIDDLE | 30 |
| 10/1/2004 16:05:00 | 4 | 4 | yes please! | END | 30 |
| 10/1/2004 16:06:00 | 2 | 2 | USER 1: and please upload only xserve-xfree86_*. I don't need anything else. | MIDDLE | 29 |
| 10/1/2004 16:06:00 | 2 | 2 | s/upload/put somewhere/ | MIDDLE | 29 |

602 — DATE CREATED; 604 — USER; 606 — CHAT UTTERANCES; 608 — CHAT UTTERANCES POSITION; 610 — CHAT DISCOURSE ID; 612 — UTTERANCE ADJUSTMENT CALCULATION

FIG. 7

REARRANGED CHAT UTTERANCE POSITION TABLE 700

| DATE CREATED | USER | CHAT UTTERANCES | CHAT UTTERANCES POSITION | CHAT DISCOURSE ID | |
|---|---|---|---|---|---|
| 10/1/2004 16:00:00 | 1 | USER 2: so if it's really not supposed to go into the archive, is that because it's debugging? in which case shouldn't it be -6unbuntu18.1? | START | 29 | CHAT DISCOURSE A 702 |
| 10/1/2004 16:00:00 | 1 | so that 19 is still new when it hits the street? | MIDDLE | 29 | |
| 10/1/2004 16:01:00 | 2 | USER 1: i only need a driver out of it... yeah well the version concept is correct | MIDDLE | 29 | |
| 10/1/2004 16:01:00 | 2 | USER 1: but nobody is using ubuntu19 | MIDDLE | 29 | |
| 10/1/2004 16:01:00 | 2 | and traashing the debs | MIDDLE | 29 | |
| 10/1/2004 16:01:00 | 2 | that's all i need atm | MIDDLE | 29 | |
| 10/1/2004 16:02:00 | 2 | USER 1: do you think you can build ppc please? | MIDDLE | 29 | |
| 10/1/2004 16:02:00 | 1 | email me a pointer to the sources, and I'll get it built | MIDDLE | 29 | |
| 10/1/2004 16:02:00 | 2 | USER 1: people.nny.com/~fabbione | MIDDLE | 29 | |
| 10/1/2004 16:02:00 | 1 | fwiw, you're less likely to get the ability to admin the chroot than you are to get a chroot... | MIDDLE | 29 | |
| 10/1/2004 16:03:00 | 2 | USER 1: honestly.. i don't mind.. really.. i just don't want to spend half day going around asking people to build X | MIDDLE | 29 | |
| 10/1/2004 16:03:00 | 2 | USER 1: if someone can take care of updating the chroot once in a while it's perfect for me | MIDDLE | 29 | |
| 10/1/2004 16:03:00 | 1 | 3.2 MB of DIFF??? sheesh | MIDDLE | 29 | |
| 10/1/2004 16:16:00 | 2 | when i write "i am dealing to maintain the chroot" is only to remove extra work load from other people | MIDDLE | 29 | |
| 10/1/2004 16:16:00 | 2 | not because i want to look cool or because i feel privileged ;) | MIDDLE | 29 | |
| 10/1/2004 16:16:00 | 1 | heh | MIDDLE | 29 | |
| 10/1/2004 16:16:00 | 1 | USER 2: just ppc, or do you need amd64 as well? | MIDDLE | 29 | |
| 10/1/2004 16:05:00 | 2 | USER 1: only ppc | MIDDLE | 29 | |
| 10/1/2004 16:05:00 | 2 | USER 1: Mithrandir did amd64 | MIDDLE | 29 | |
| 10/1/2004 16:06:00 | 2 | USER 1: and please upload only xserve-xfree86_*. I don't need anything else. | MIDDLE | 29 | |
| 10/1/2004 16:06:00 | 2 | s/upload/put somewhere/ | MIDDLE | 29 | |
| 10/1/2004 16:12:00 | 1 | USER 2: give me about 90 minutes or so, iirc | MIDDLE | 29 | |
| 10/1/2004 16:13:00 | 2 | USER 1: super! it's ok for me | MIDDLE | 29 | |
| 10/1/2004 16:14:00 | 2 | UHA UHA UHA the Xv extension fix seems to be working | MIDDLE | 29 | |
| 10/1/2004 16:15:00 | 2 | *ONLY* 4 days of debugging | MIDDLE | 29 | |
| 10/1/2004 16:18:00 | 1 | USER 2: you're not debugging features into existance are you???? :-) | END | 29 | |
| 10/1/2004 16:04:00 | 3 | USER 4: is -firefox a release goal now? | START | 30 | CHAT DISCOURSE B 704 |
| 10/1/2004 16:05:00 | 4 | USER 3: yes | MIDDLE | 30 | |
| 10/1/2004 16:05:00 | 3 | USER 4: so i should be ok to integrate and upload PR1? | MIDDLE | 30 | |
| 10/1/2004 16:05:00 | 4 | yes please! | END | 30 | |

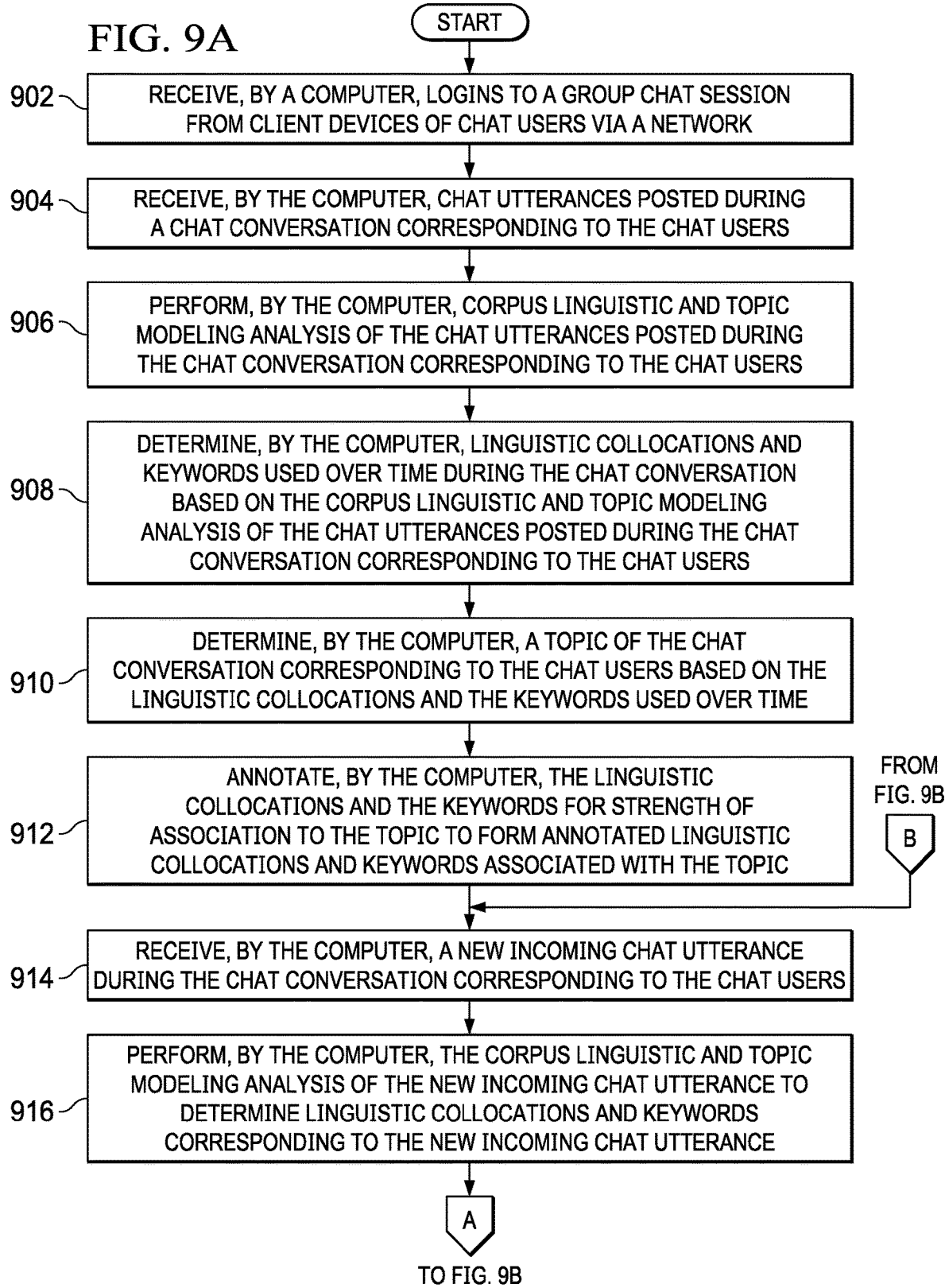

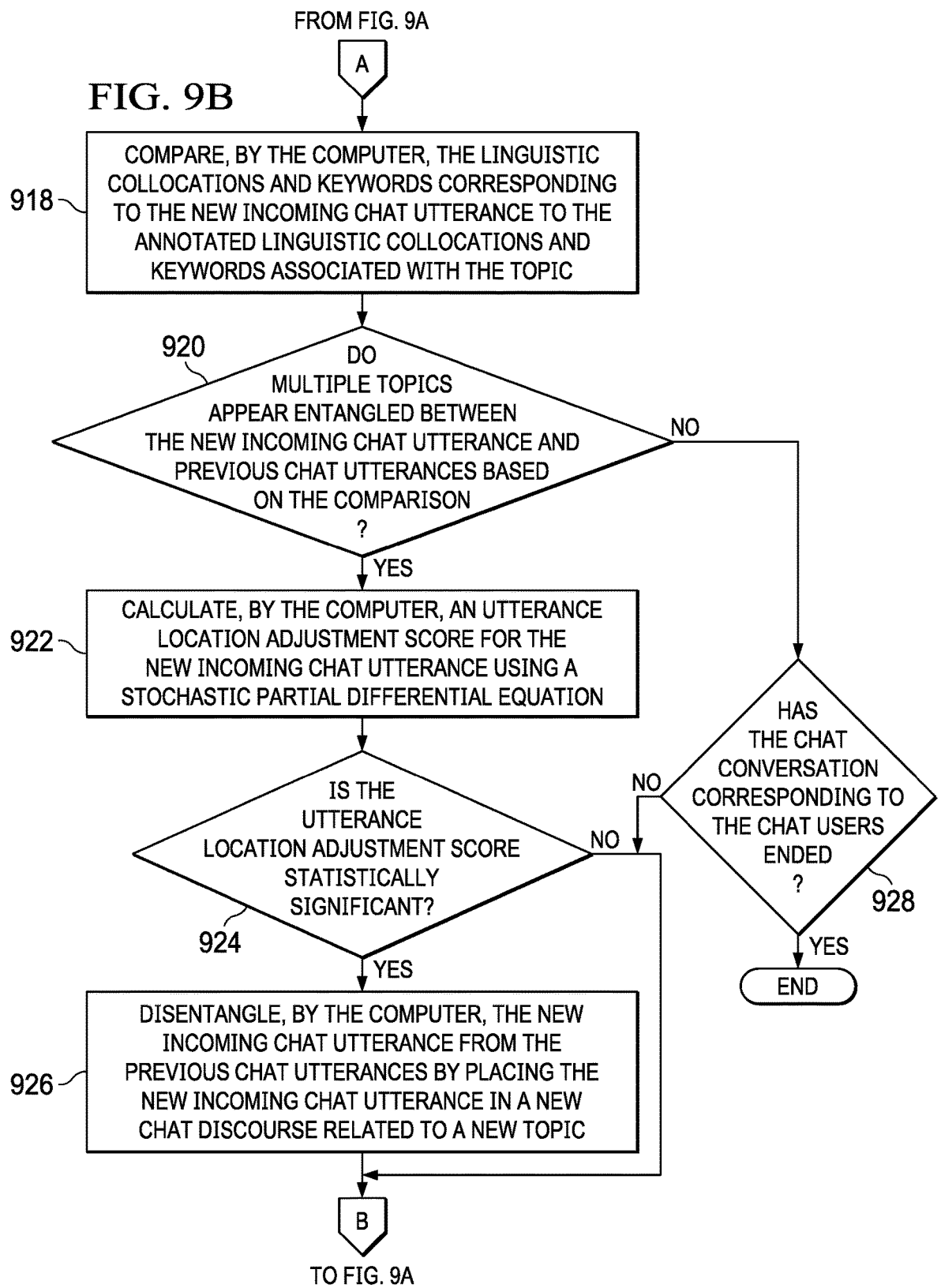

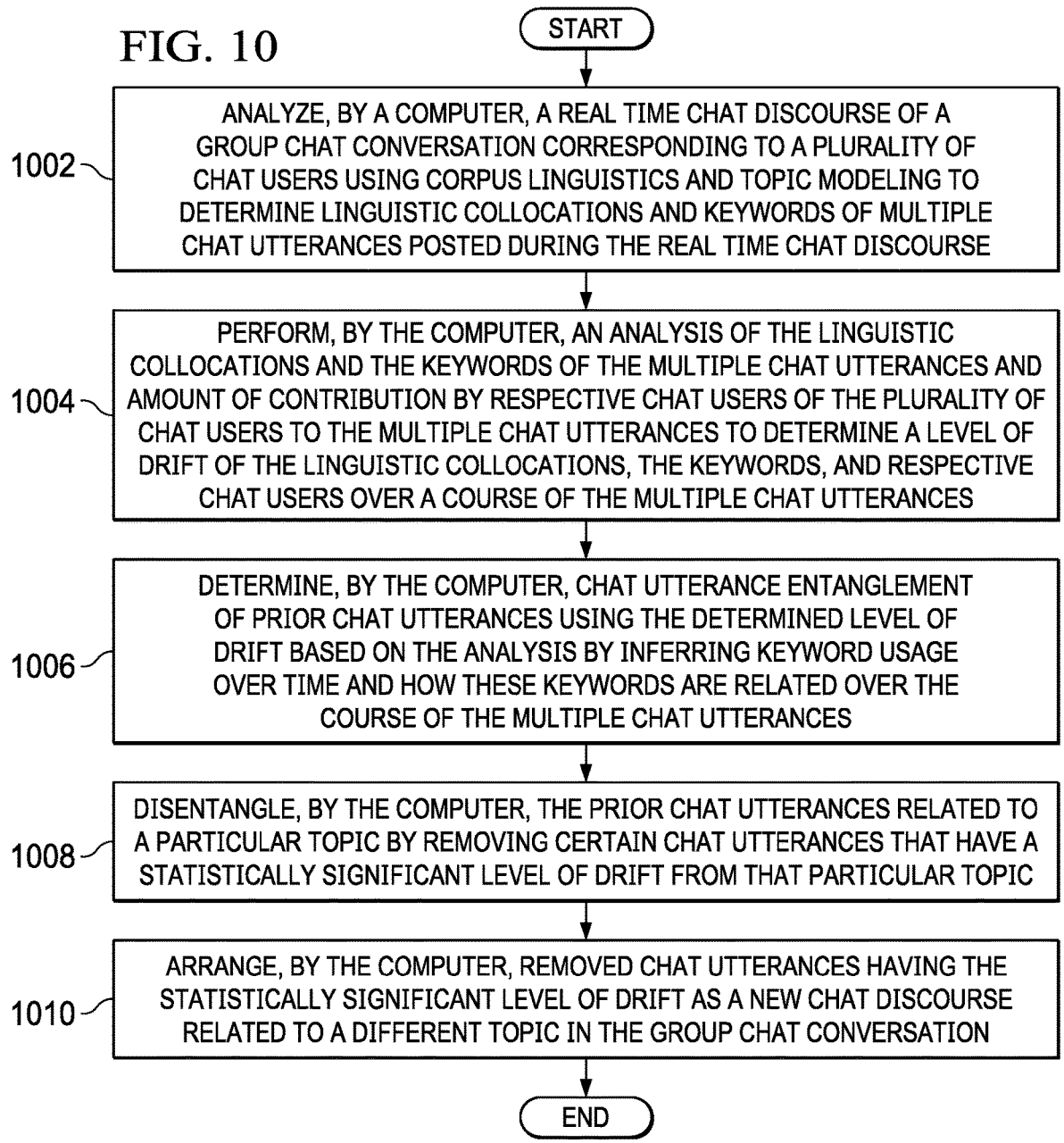

DISENTANGLEMENT OF CHAT UTTERANCES

BACKGROUND

1. Field

The disclosure relates generally to corpus linguistics and topic modeling and more specifically to determining entanglement of chat utterances relating to different topics during a chat session between multiple chat users using corpus linguistics and topic modeling and disentangling chat utterances related to the different topics using an utterance location adjustment calculation.

2. Description of the Related Art

Corpus linguistics is the study of language as expressed in corpora or samples of real-world text. Corpus linguistics proposes that reliable language analysis is more feasible with corpora collected in the field in its natural context. The text-corpus method is a digestive approach that derives a set of abstract rules that govern a natural language from texts in that language, and explores how that language relates to other languages. Originally derived manually, corpora now are automatically derived from source texts.

Corpus linguistics utilizes, for example, annotation, abstraction, and analysis. Annotation applies a scheme to texts. Annotations may include structural markup, part-of-speech tagging, parsing, and other representations. Abstraction translates or maps terms in the scheme to terms in a theoretically motivated dataset. Abstraction typically includes linguist-directed search, but may include, for example, rule-learning for parsers. Analysis consists of statistically probing, manipulating, and generalizing from the dataset. Analysis may also include statistical evaluations, optimization of rule-bases, or knowledge discovery methods.

In corpus linguistics, a collocation is a series of words or phrases that co-occur more often than would be expected by chance. Collocation extraction is a computational technique that finds collocations in a document or text-corpus, using various computational linguistics elements, which resembles data mining.

Corpus linguists specify a keyword in context and identify the keywords immediately surrounding them. In corpus linguistics, a keyword is a word that occurs in a text-corpus more often than would be expected to occur by chance alone. Corpus linguists calculate keywords by performing a statistical test, such as, for example, loglinear, which compares the word frequencies in a text-corpus against their expected frequencies derived in a much larger text-corpus, which acts as a reference for general language use. Thus, keyness is the quality a word or phrase has as being key in its context. In contrast, collocation is the quality linking two words or phrases usually assumed to be within a given span of each other. In other words, keyness is a textual feature, whereas collocation is a language feature.

A topic model is a statistical model used in natural language processing for discovering topics that occur in a text-corpus. Typically, a text-corpus includes multiple topics in different proportions. For example, in a text-corpus that is 10% about cats and 90% about dogs, there would probably be about 9 times more dog words than cat words. The topics discovered by topic modeling are clusters of similar words. A topic model captures this intuition in a mathematical framework, which allows examining a text-corpus and discovering, based on the statistics of the words in the text-corpus, which topics are included in the text-corpus and what is the balance between topics.

Latent Dirichlet allocation is an example of a topic model. Latent Dirichlet allocation is a statistical model that allows sets of observations to be explained by unobserved groups that explain why some parts of the data are similar. For example, if observations are words collected into a text-corpus, latent Dirichlet allocation reasons that the text-corpus is a mixture of different topics and that each word's presence is attributable to one of the topics in the text-corpus. In other words, latent Dirichlet allocation maps words to different topics.

SUMMARY

According to one illustrative embodiment, a computer-implemented method for disentanglement of chat utterances is provided. A computer performs an analysis of the linguistic collocations and the keywords of the multiple chat utterances and amount of contribution by respective chat users of the plurality of chat users to the multiple chat utterances to determine a level of drift of the linguistic collocations, the keywords, and respective chat users over a course of the multiple chat utterances. The computer determines chat utterance entanglement of prior chat utterances using determined level of drift based on the analysis by inferring keyword usage over time and how these keywords are related over the course of the multiple chat utterances. The computer disentangles the prior chat utterances related to a particular topic by removing certain chat utterances that have a statistically significant level of drift from that particular topic. The computer arranges removed chat utterances having the statistically significant level of drift as a new chat discourse related to a different topic in the chat conversation. According to other illustrative embodiments, a computer system and computer program product for disentanglement of chat utterances are provided.

BRIEF DESCRIPTION OF THE DRAWINGS

FIG. 6 is a diagram illustrating an example of a chat utterance position table in accordance with an illustrative embodiment;

FIG. 7 is a diagram illustrating an example of a rearranged chat utterance position table in accordance with an illustrative embodiment;

FIGS. 9A-9B are a flowchart illustrating a process for disentanglement of chat utterances in accordance with an illustrative embodiment; and FIG. 10 is a flowchart illustrating a process for rearranging chat utterances in accordance with an illustrative embodiment.

DETAILED DESCRIPTION

Figure 1:
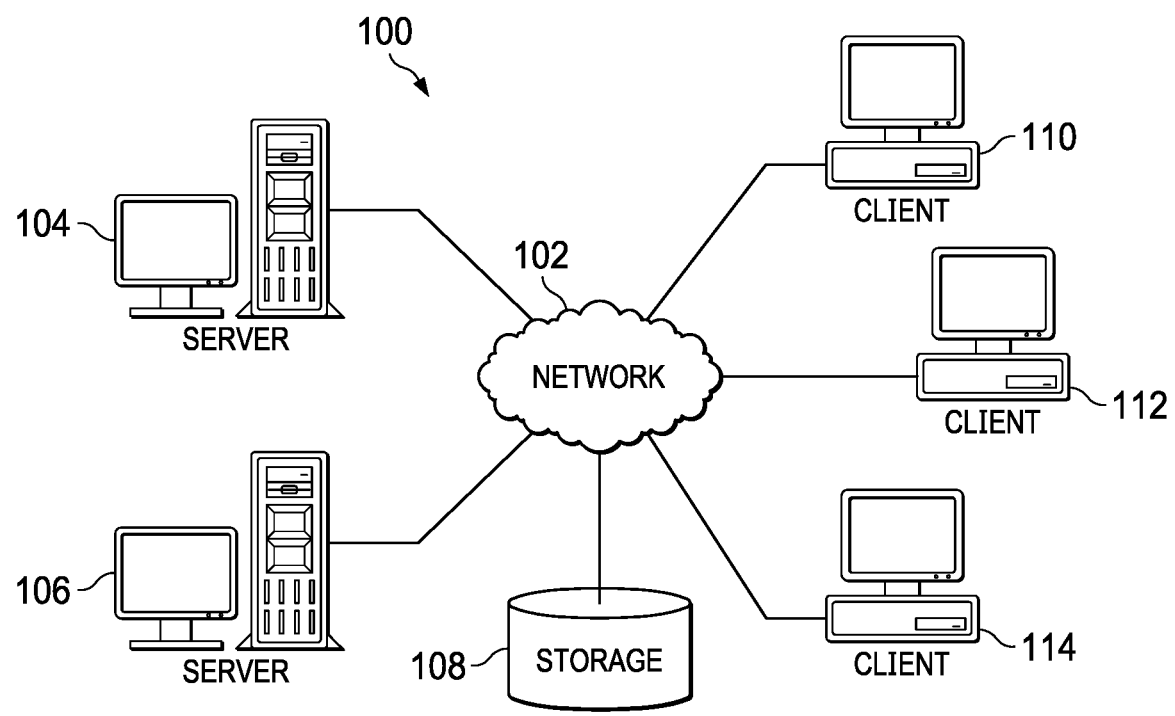
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
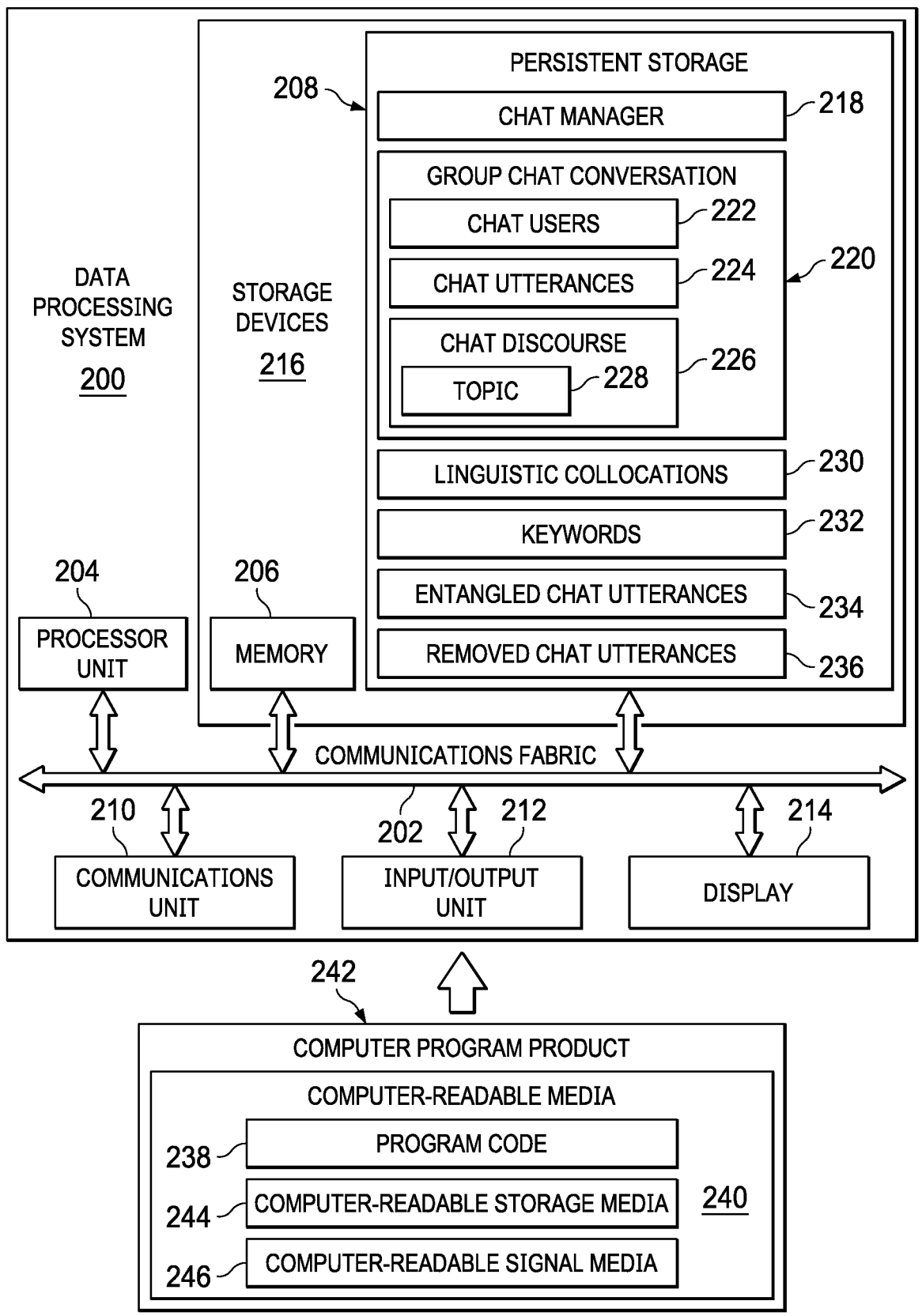
FIG. 2 is a diagram of a data processing system in which illustrative embodiments may be implemented.
Figure 3A:
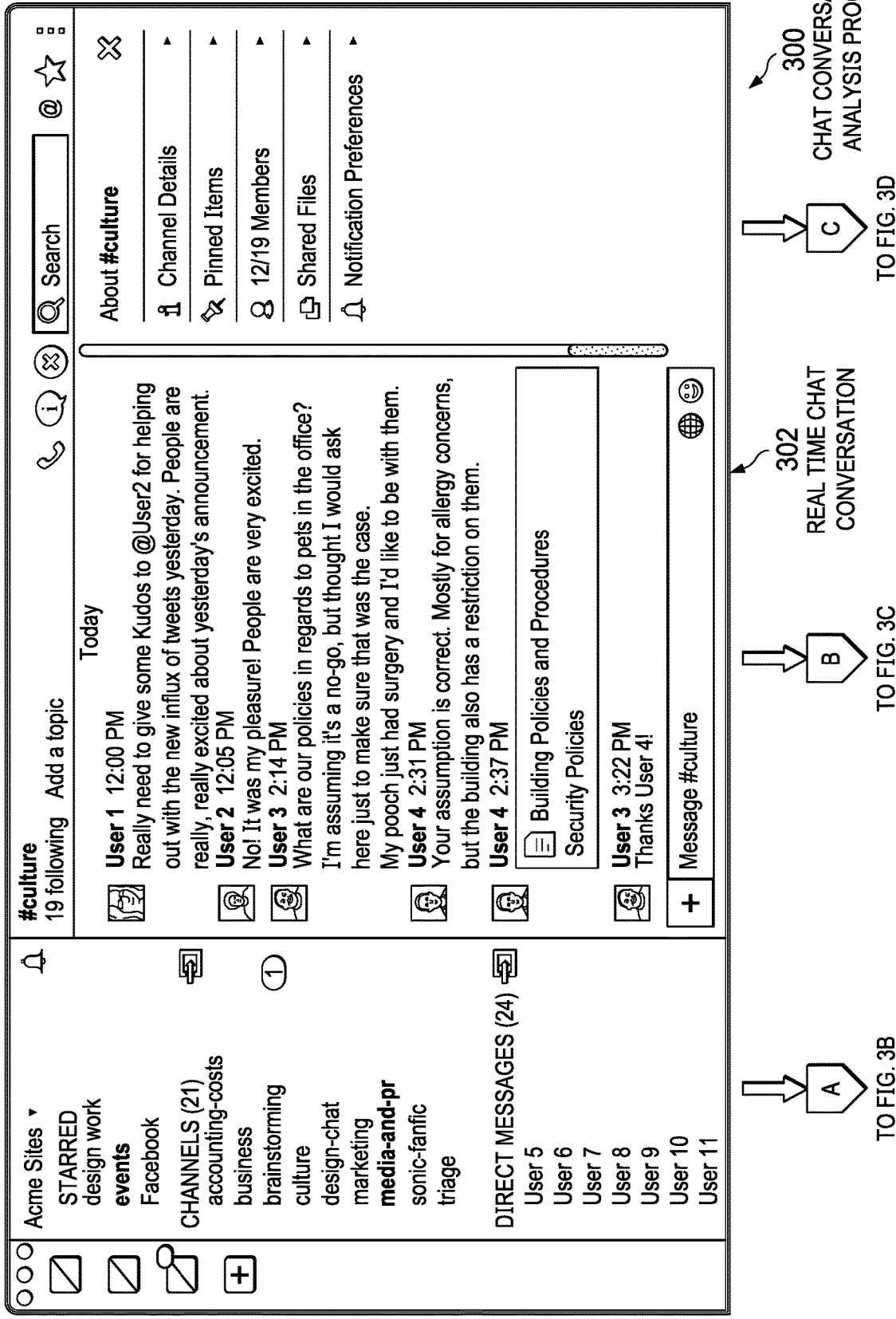
FIGS. 3A-3D are a diagram illustrating an example of a chat conversation analysis process in accordance with an illustrative embodiment.
Figure 3B:
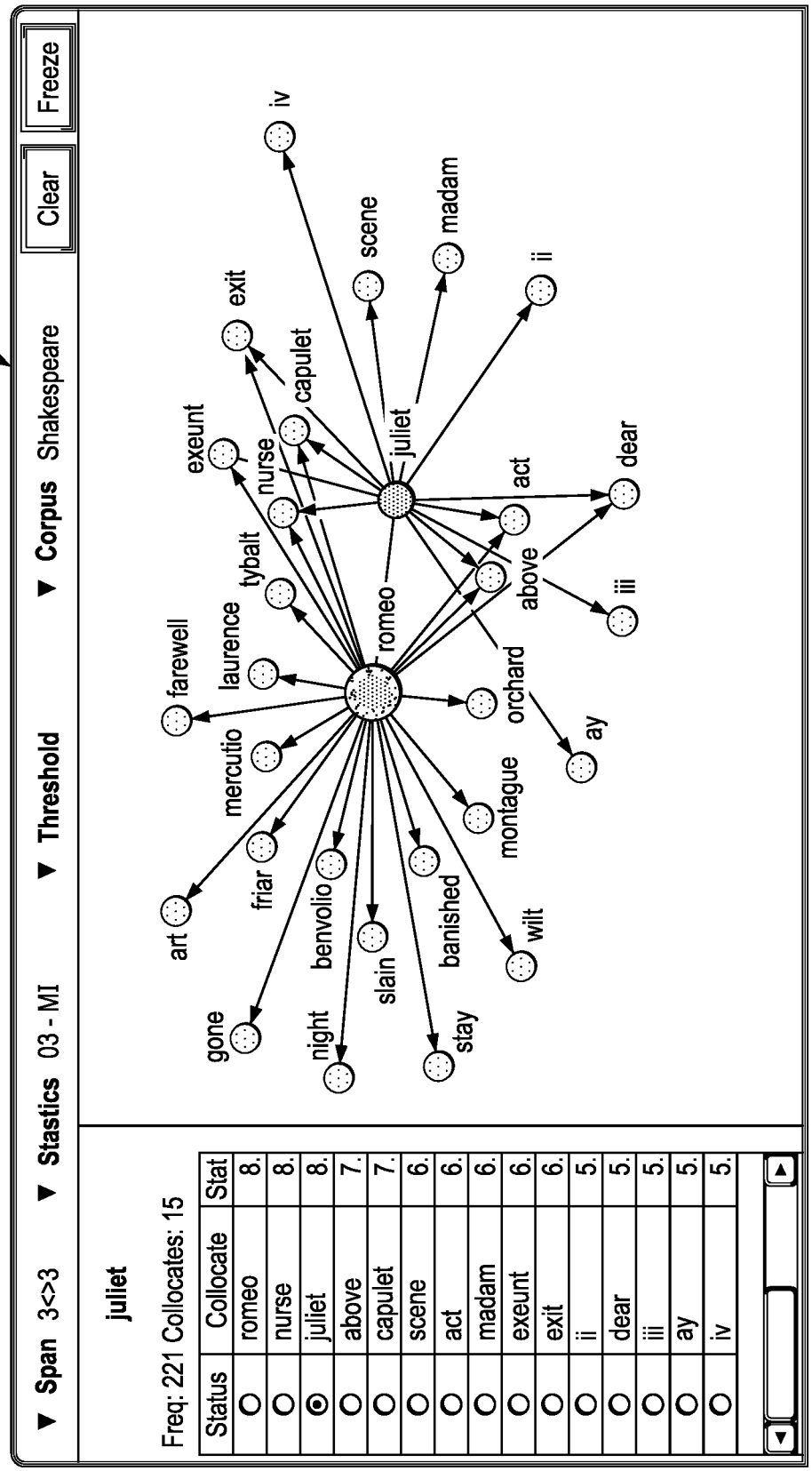
Figure 3C:
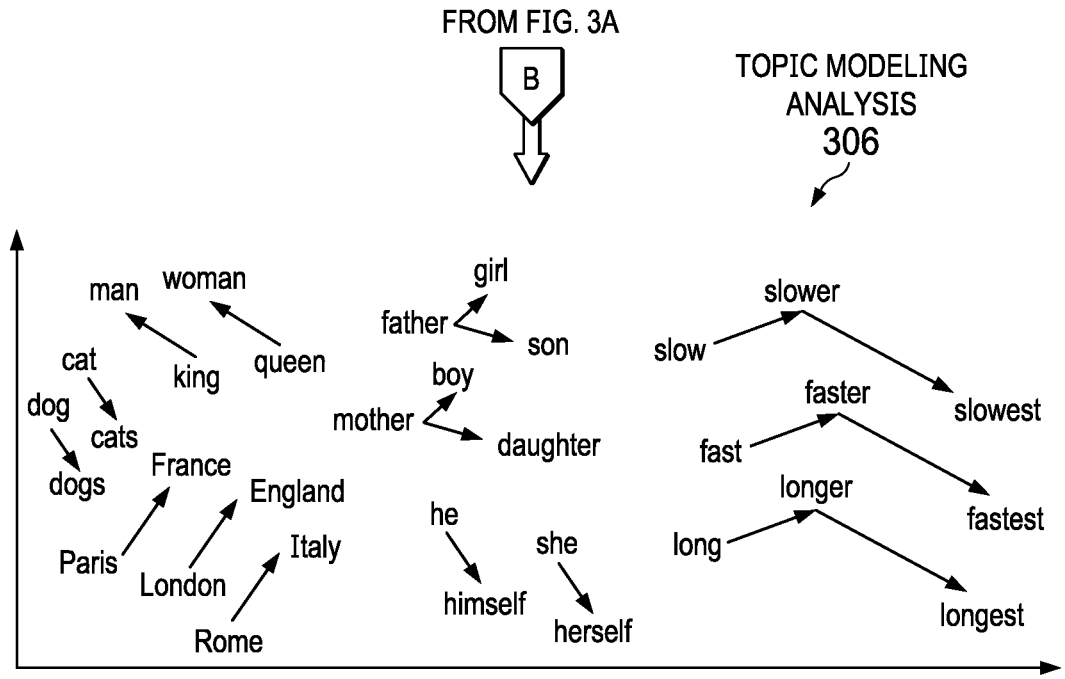
Figure 3D:
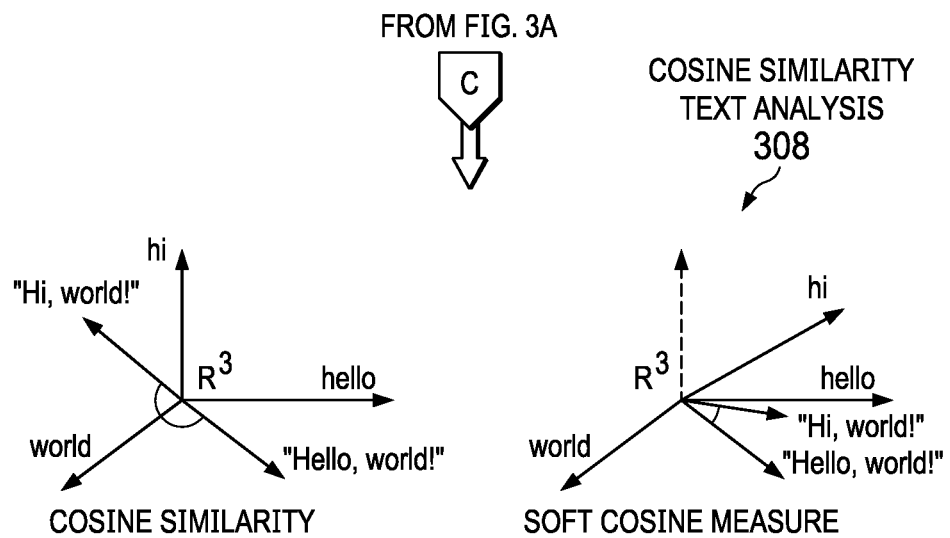

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide chat management services for subscribing group chat users. Also, it should be noted that server 104 and server 106 may each represent a cluster of servers in one or more data centers. Alternatively, server 104 and server 106 may each represent multiple computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, smart phones, smart watches, smart televisions, gaming devices, and the like, with wire or wireless communication links to network 102. Users of clients 110, 112, and 114 may utilize clients 110, 112, and 114 to send and receive group chat messages and to access and utilize the chat management services provided by server 104 and server 106. In addition, server 104 and server 106 may provide information to clients 110, 112, and 114, such as, for example, software applications and programs, software updates, software fixes, files, data, and the like.

Storage 108 is a network storage device capable of storing any type of data in a structured format or an unstructured format. In addition, storage 108 may represent a plurality of network storage devices. Further, storage 108 may store identifiers and network addresses for a plurality of different client devices, identifiers for a plurality of different chat users corresponding to the different client devices, historical group chat conversations, linguistic collocations and keywords corresponding to the historical group chat conversations, and the like. Furthermore, storage 108 may store other types of data, such as authentication or credential data that may include user names, passwords, and biometric data associated with chat users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer readable program code or instructions implementing the chat management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or a computer readable storage medium is any piece of hardware that is capable of storing information, such as, for example, without limitation, data, computer readable program code in functional form, and/or other suitable information either on a transient basis or a persistent basis. Further, a computer readable storage device or a computer readable storage medium excludes a propagation medium, such as transitory signals. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores chat manager 218. However, it should be noted that even though chat manager 218 is illustrated as residing in persistent storage 208, in an alternative illustrative embodiment chat manager 218 may be a separate component of data processing system 200. For example, chat manager 218 may be a hardware component coupled to communication fabric 202 or a combination of hardware and software components. In another alternative illustrative embodiment, a first set of components of chat manager 218 may be located in data processing system 200 and a second set of components of chat manager 218 may be located in a second data processing system, such as, for example, server 106 in FIG. 1. In yet another alternative illustrative embodiment, chat manager 218 may be located in a client device, such as, for example, client 110 in FIG. 1, in addition to, or instead of, data processing system 200.

Chat manager 218 controls the process of determining entanglement of chat utterances relating to different topics during an online group chat session between multiple chat users based on corpus linguistics and topic modeling analyses of linguistic collocations and keywords identified in the different chat utterances and disentangling entangled chat utterances related to the different topics. Group chat conversation 220 represents an entire real time chat session between a group of chat users. However, it should be noted that group chat conversation 220 may represent a plurality of real time chat sessions simultaneously managed by chat manager 218 in parallel.

Chat users 222 represent unique identifiers for each of the respective chat users who post chat utterances 224 during group chat conversation 220. A chat utterance is a single chat message or chat payload posted by a particular chat user of chat users 222. Chat utterances 224 comprise chat discourse 226. Chat discourse 226 corresponds to topic 228. Topic 228 is a particular topic or subject of discussion between two or more of chat users 222 during group chat conversation 220 and may include any topic of discussion. However, it should be noted that chat utterances 224 may relate to more than one chat discourse (i.e., topic) during group chat conversation 220. In other words, one chat discourse corresponds to one particular topic and another chat discourse corresponds to a different topic during group chat conversation 220. As a result, discussion of different topics may become entangled (e.g., interwoven or mixed together) in chat utterances 224.

Chat manager 218 determines linguistic collocations 230 and keywords 232 of chat utterances 224 using, for example, corpus linguistics analysis, topic modeling analysis, and the like. Linguistic collocations 230 represent a collection of words or terms used specifically in chat utterances 224 for determining a particular topic of discussion. Keywords 232 represent a collection of words that are key to that particular topic. Chat manager 218 utilizes linguistic collocations 230 and keywords 232 to determine when different topics are being discussed in chat utterances 224. In other words, chat manger 218 utilizes linguistic collocations 230 and keywords 232 to determine when one or more chat utterances of chat utterances 224 are drifting from topic 228. Chat manager 218 may utilize, for example, an utterance location adjustment score corresponding to each respective chat utterances in chat utterances 224 to determine topic drift (i.e., entangled chat utterances 234). For example, chat manager 218 may determine that one or more particular chat utterances having an utterance location adjustment score above a predefined threshold level are related to a different topic from topic 228. Thus, those one or more particular chat utterances are entangled with other of chat utterances 224 relating to topic 228. Chat manager 218 disentangles those one or more particular chat utterances relating to the different topic by removing those one or more particular chat utterances from chat utterances 224 to form removed chat utterances 236. Chat manager 218 places removed chat utterances 236 in a separate chat discourse, which relates to the different topic, of group chat conversation 220.

As a result, data processing system 200 operates as a special purpose computer system in which chat manager 218 in data processing system 200 enables disentanglement of entangled chat utterances relating to the different topics during an online group chat session. In particular, chat manager 218 transforms data processing system 200 into a special purpose computer system as compared to currently available general computer systems that do not have chat manager 218. Further, chat manager 218 improves the performance of data processing system 200 by allowing data processing system 200 to differentiate between chat discourses related to different topics, which current data processing systems are not able to do.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246.

In these illustrative examples, computer readable storage media 244 is a physical or tangible storage device used to store program code 238 rather than a medium that propagates or transmits program code 238. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 240" can be singular or plural. For example, program code 238 can be located in computer readable media 240 in the form of a single storage device or system. In another example, program code 238 can be located in computer readable media 240 that is distributed in multiple data processing systems. In other words, some instructions in program code 238 can be located in one data processing system while other instructions in program code 238 can be located in one or more other data processing systems. For example, a portion of program code 238 can be located in computer readable media 240 in a server computer while another portion of program code 238 can be located in computer readable media 252 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 238.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

An inherent issue with a real time online chat conversation between multiple users on computing systems is that these users can engage in multiple discourses related to different topics at substantially the same time in parallel during the course of the entire chat conversation. This mixing of discourses related to different topics is generally not an issue for those users during the real time online chat conversation. However, this entanglement of parallel discourses relating to different topics during the live online chat conversation is a non-trivial issue for computing systems and domain of information retrieval. For example, current computing systems are not capable of identifying one discourse from another. Further, current computing systems fail to provide chat users with a way to disentangle these parallel discourses relating to the different topics during a real time online chat conversation.

As an illustrative example, assume a live online group chat involves four users (i.e., users 1-4). Users 1-4 may enter chat utterances during the group chat in a random manner (i.e., time between postings may not be uniform or equal). Additionally, a user in the group may post a new chat utterance that is not related to the prior chat utterance, which starts a new discourse related to a different topic in the group chat conversation. As a result, chat utterances that correspond to different chat discourses relating to different topics may become entangled during the group chat conversation. As used herein, a chat conversation relates to an entire online group chat session between multiple users in real time. A chat discourse relates to one particular topic within the entire chat conversation. In other words, each respective chat discourse within a chat conversation relates to a different topic. A chat utterance relates to one chat message, sentence, or payload, which is entered by a particular user, relating to a particular topic.

Illustrative embodiments "disentangle" chat utterances related to different topic discourses during a group chat conversation to afford greater clarity to users and computing systems. Illustrative embodiments perform linguistic collocation and keyword analysis on a chat discourse related to a particular topic during a real time chat conversation between multiple users to determine linguistic collocations and keywords corresponding to a topic of the chat discourse. Illustrative embodiments also determine the level of contribution of each respective user to the chat discourse and determine the level of drift from that particular topic by a particular user during the conversation over time. Further, illustrative embodiments determine the level of drift in chat utterances in the chat discourse by using a drift measurement (i.e., an utterance location adjustment score) corresponding to the chat utterances made by each respective user in the group chat. By determining the results above, illustrative embodiments can disentangle chat utterances relating to different topics during the chat conversation in real time.

Moreover, illustrative embodiments are capable of deriving associated chat discourses that may happen over various online mediums (e.g., instant messages, emails, and the like), which are referenced in a particular chat discourse. For example, if a user mentions a particular topic not just in chat discourse A between 5 users, but also in chat discourse B between 2 people, then illustrative embodiments can visually reference each of the 2 different chat discourses.

Furthermore, illustrative embodiments can visually disentangle chat discourses of chat utterances corresponding to different topic differently for different users based on content the different users see or have seen previously. For example, a user joining a group chat after 2 different chat discourses have gone on for some time, illustrative embodiments may visually display the 2 different chat discourses in a different order, which while not accurate historically, will be accurate narratively.

In understanding the users' chat utterances in various chat discourses, illustrative embodiments may also ascertain the probability of a given set of users creating a situation of entangled group chat conversations. In addition, illustrative embodiments may use inverse modeling to artificially create entangled group chat conversations for research purposes.

Thus, illustrative embodiments provide one or more technical solutions that overcome a technical problem with computer systems being capable of identifying one chat discourse from another. As a result, these one or more technical solutions provide a technical effect and practical application in the field of online group chats.

With reference now to FIGS. 3A-3D, a diagram illustrating an example of a chat conversation analysis process is depicted in accordance with an illustrative embodiment. Chat conversation analysis process 300 may be implemented in a computer, such as, for example, server 104 in FIG. 1 or data processing system 200 in FIG. 2.

In this example, chat conversation analysis process 300 analyzes real time chat conversation 302. Real time chat conversation 302 may be, for example, group chat conversation 220 in FIG. 2. Chat conversation analysis process 300 analyzes real time chat conversation 302 using corpus linguistics analysis 304, topic modeling analysis 306, and cosine similarity text analysis 308.

Chat conversation analysis process 300 analyzes real time chat conversation 302 using corpus linguistics analysis 304 to determine key linguistic collocations of chat utterances (i.e., collection of words or terms used specifically in chat utterances during a chat conversation to determine a topic of a particular chat discourse). Chat conversation analysis process 300 analyzes real time chat conversation 302 using topic modeling analysis 306 to infer the likelihood of key landmark terms (i.e., collection of keywords corresponding to a particular topic). Chat conversation analysis process 300 analyzes real time chat conversation 302 using cosine similarity text analysis 308 to determine similarity or relationship between keywords in the chat conversation.

Figure 4:
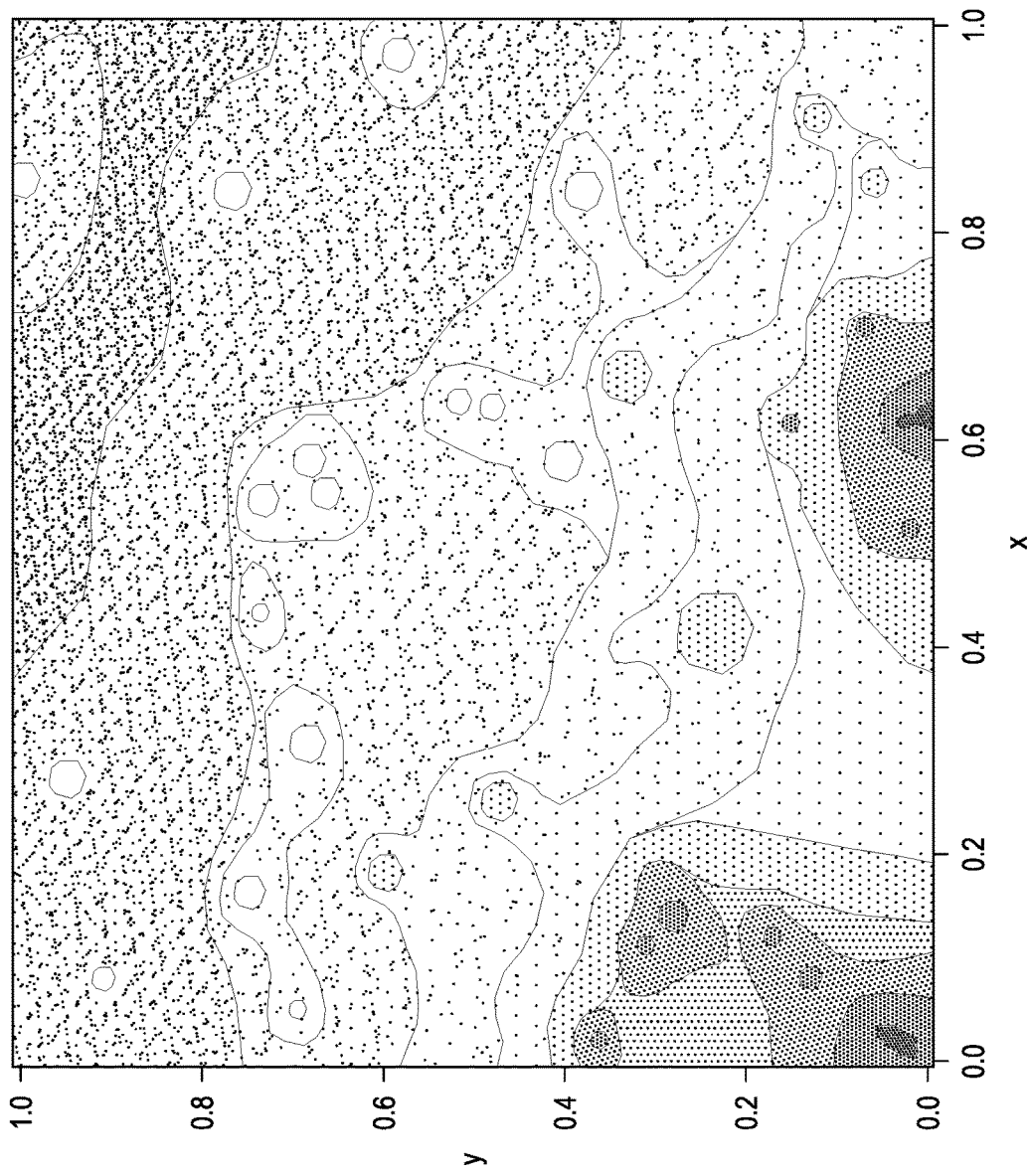
FIG. 4 is a diagram illustrating an example of diffusion analysis in accordance with an illustrative embodiment.

With reference now to FIG. 4, a diagram illustrating an example of diffusion analysis is depicted in accordance with an illustrative embodiment. Diffusion analysis 400 may be implemented in a computer, such as, for example, server 104 in FIG. 1 or data processing system 200 in FIG. 2. In this example, the output of diffusion analysis 400 is a heat map. For example, points nearer the origin of the chart may represent linguistic collocations, keywords, and chat users that correspond to chat utterances most often in the course of a chat conversation.

A chat manager, such as, for example, chat manager 218 in FIG. 2, performs diffusion analysis 400 (e.g., distance analysis) on both chat utterance content (i.e., linguistic collocations and keywords) and chat users corresponding to the chat utterances. The chat manager performs diffusion analysis 400 to understand the level of drift corresponding to both chat utterance content and chat users over time during the course of multiple chat utterances. For example, if the chat manager considers the use of chat utterance content and chat users over time in the form of "white noise", then the chat manager can model the level of drift in white noise over time.

The chat manager may utilize, for example, partial differential equations for diffusion analysis 400. Partial differential equations are equations that involve rates of change with respect to continuous variables. For example, the chat manager specifies the position of chat utterances relative to a salutation (i.e., chat discourse beginning) and valediction (i.e., chat discourse ending) utilizing six parameters. The six parameters include salutation chat utterance position, valediction chat utterance position, chat discourse identifier, chat utterance inter-arrival time, salutation count, and valediction count. Salutation chat utterance position is the position of a chat utterance in a particular chat discourse relative to a salutation chat utterance. Valediction chat utterance position is the position of a chat utterance in a particular chat discourse relative to a valediction chat utterance. Chat discourse identifier is a numeric value assignment denoting which particular chat discourse (i.e., chat conversation cluster) a particular chat utterance belongs to. Consider this value as a numerical representation of a "chat utterance cluster", whereby the aforementioned chat utterance cluster is defined as a collection of similar chat utterances. Chat utterance inter-arrival time is the time (e.g., in seconds) between the post time of a salutation chat utterance and a non-salutation chat utterance. Salutation Count is the number of messages that comprise a salutation (e.g., a salutation may be a collection of chat utterances from a single or multiple users). Valediction Count is the number of messages that comprise of a valediction (e.g., a valediction may be a collection of chat utterances from a single or multiple users).

However, the chat manager determines the topic of a chat utterance by the continuous distribution of several parameters, such as the linguistic collocations of chat utterances, likelihood of chat utterance keywords, chat users, and the like. The dynamics for chat utterance position take place in a finite-dimensional configuration space (i.e., the words or terms used for a particular topic only change so much), whereas the dynamics for chat content occur in an infinite-dimensional configuration space (i.e., the number of topics discussed during a conversation is potentially unlimited).

Figure 5:
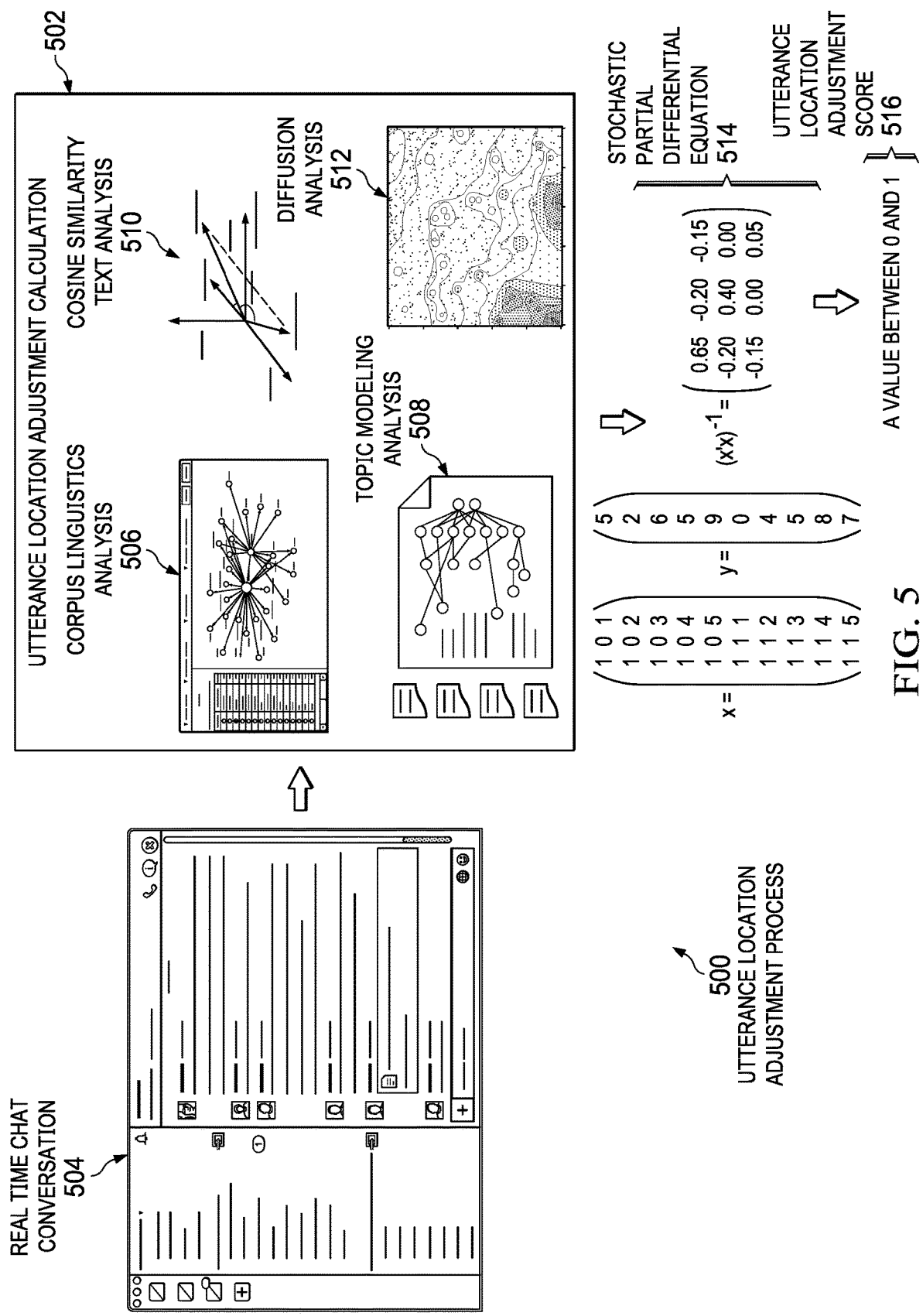
FIG. 5 is a diagram illustrating an example of an utterance location adjustment process in accordance with an illustrative embodiment.

With reference now to FIG. 5, a diagram illustrating an example of an utterance location adjustment process is depicted in accordance with an illustrative embodiment. Utterance location adjustment process 500 may be implemented in a computer, such as, for example, server 104 in FIG. 1 or data processing system 200 in FIG. 2.

In this example, a chat manager, such as, for example, chat manager 218 in FIG. 2, performs utterance location adjustment calculation 502 on each chat utterance posted by chat users in real time chat conversation 504. Real time chat conversation 504 may be, for example, real time chat conversation 302 in FIG. 3A. The chat manager performs utterance location adjustment calculation 502 on each chat utterance posted in real time chat conversation 504 based on the results of corpus linguistics analysis 506, topic modeling analysis 508, cosine similarity text analysis 510, and diffusion analysis 512. Corpus linguistics analysis 506, topic modeling analysis 508, cosine similarity text analysis 510, and diffusion analysis 512 may be, for example, corpus linguistics analysis 304, topic modeling analysis 306, cosine similarity text analysis 308 in FIGS. 3B-3D and diffusion analysis 400 in FIG. 4.

The chat manager performs utterance location adjustment calculation 502 using stochastic partial differential equation 514. The output of utterance location adjustment calculation 502 is utterance location adjustment score 516 for each chat utterance posted in real time chat conversation 504. Utterance location adjustment score 516 is a value between 0 and 1. A value of 0 indicates no drift of a new chat utterance from a chat discourse related to an initial topic in the chat conversation (i.e., no topic entanglement). A value of 1 indicates drift of the new chat utterance from the chat discourse related to the initial topic (i.e., topic entanglement). However, it should be noted that the chat manager may determine that an utterance location adjustment score greater than 0.5 may be statistically significant and determine that the corresponding chat utterance has drifted.

By combining the results of corpus linguistics analysis 506, topic modeling analysis 508, cosine similarity text analysis 510, and diffusion analysis 512, the chat manager is able to infer the use of linguistic collocations and keywords in chat utterances over time and how these linguistic collocations and keywords are related across subsequent chat utterances. If the chat manager determines that the level of drift of the new chat utterance from a prior chat utterance is a statistically significant level of drift or is greater than a defined threshold level of drift, then the chat manager determines that the new chat utterance is entangled with the prior chat utterance. In other words, the chat manager determines that the new chat utterance relates to a different topic than the initial topic corresponding to the prior chat utterance in the chat conversation.

With reference now to FIG. 6, a diagram illustrating an example of a chat utterance position table is depicted in accordance with an illustrative embodiment. Chat utterance position table 600 may be implemented in a computer, such as, for example, server 104 in FIG. 1 or data processing system 200 in FIG. 2.

In this example, chat utterance position table 600 includes date created 602, user 604, chat utterance 606, chat utterance position 608, and chat discourse identifier 610. Date created 602 identifies when a particular chat utterance was posted by a particular chat user, who is identified by user 604. User 604 identifies each respective chat user included in the group chat conversation. Chat utterance 606 records the text or content of each respective chat utterance posted by each particular chat user. Chat utterance position 608 identifies where a particular chat utterance is located, such as, for example, "START", "MIDDLE", or "END", within a particular chat discourse, which is identified by chat discourse identifier 610. Chat discourse identifier 610 identifies each different chat discourse during the entire group chat conversation.

A chat manager, such as, for example, chat manager 218 in FIG. 2, utilizes an utterance location adjustment score of each respective chat utterance to disentangle chat utterances corresponding to different chat discourses during the entire chat conversation of the group. In this example, the chat manager labels the initial chat discourse as chat discourse identifier "29". During the course of the chat conversation, the chat manager detects four chat utterances that have significant drift from initial chat discourse 29 by performing utterance location adjustment calculation 612 for each of the chat utterances posted during the chat conversation. The chat manager then labels these four chat utterances having significant drift (i.e., having an utterance location adjustment score that is statistically significant or having an utterance location adjustment score that is greater than a defined threshold level) as chat discourse identifier "30". In other words, the chat manager determined that chat discourse 30 is related to a topic that is different from the initial chat discourse 29.

With reference now to FIG. 7, a diagram illustrating an example of a rearranged chat utterance position table is depicted in accordance with an illustrative embodiment. Rearranged chat utterance position table 700 may be implemented in a computer, such as, for example, server 104 in FIG. 1 or data processing system 200 in FIG. 2.

A chat manager, such as, for example, chat manager 218 in FIG. 2, rearranges the chat utterances from the example of FIG. 6 in categorial order by corresponding chat discourse identifier, such as chat discourse identifier 610 in FIG. 6. As a result, the chat manager arranges all chat utterances corresponding to chat discourse identifier 29 within chat discourse A 702, which relates to an initial topic of the group chat, in chronological order from chat utterance position "START" to chat utterance position "END". Similarly, the chat manager arranges all chat utterances corresponding to chat discourse identifier 30 within chat discourse B 704, which relates to a different topic of the group chat, in chronological order from chat utterance position "START" to chat utterance position "END". In this example, chat discourse A 702 is between chat users 1 and 2 of the group chat and chat discourse B 704 is between chat users 3 and 4 of the group chat.

Figure 8:
FIG. 8 is a diagram illustrating an example of a message fragment in accordance with an illustrative embodiment.

With reference now to FIG. 8, a diagram illustrating an example of a message fragment is depicted in accordance with an illustrative embodiment. In this example, message fragment 800 is a JavaScript Object Notation message fragment. However, it should be noted that message fragment 800 is intended as an example only and not as a limitation on illustrative embodiments. In other words, message fragment 800 may represent any type of message format that may be utilized by different illustrative embodiments.

Illustrative embodiments utilize the utterance location adjustment calculation, such as, for example, utterance location adjustment calculation 504 in FIG. 5 or utterance location adjustment calculation 612 in FIG. 6, to preemptively arrange new incoming chat utterances in real time. Illustrative embodiments may calculate the utterance location adjustment score on a new incoming chat utterance within a message queue as part of a microservice, for example. Depending on the value of the utterance location adjustment score corresponding to the new incoming chat utterance, illustrative embodiments can either maintain the new incoming chat utterance in the current chat discourse regarding a particular topic or move the new incoming chat utterance to a new chat discourse regarding a different topic within a user interface.

In this example, a chat manager, such as, for example, chat manager 218 in FIG. 2, calculates utterance location adjustment score 802, which is 0.15, and utterance location adjustment score 804, which is 0.27, for new incoming chat utterances included in message fragment 800. Because utterance location adjustment score 802 and utterance location adjustment score 804 are less than, for example, 0.5, the chat manager maintains the new incoming chat utterances in the same chat discourse. In other words, the chat manager determined that utterance location adjustment score 802 and utterance location adjustment score 804 were not statistically significant to indicate topic drift in the chat utterances.

With reference now to FIGS. 9A-9B, a flowchart illustrating a process for disentanglement of chat utterances is shown in accordance with an illustrative embodiment. The process shown in FIGS. 9A-9B may be implemented in a computer, such as, for example, server 104 in FIG. 1 or data processing system 200 in FIG. 2. For example, the process shown in FIGS. 9A-9B may be implemented in chat manager 218 in FIG. 2.

The process begins when the computer receives logins to a group chat session from client devices of chat users via a network (step 902). Afterward, the computer receives chat utterances posted during a chat conversation corresponding to the chat users (step 904). The computer performs corpus linguistic and topic modeling analysis of the chat utterances posted during the chat conversation corresponding to the chat users (step 906).

The computer determines linguistic collocations and keywords used over time during the chat conversation based on the corpus linguistic and topic modeling analysis of the chat utterances posted during the chat conversation corresponding to the chat users (step 908). In addition, the computer determines a topic of the chat conversation corresponding to the chat users based on the linguistic collocations and the keywords used over time (step 910). The computer also annotates the linguistic collocations and the keywords for strength of association to the topic to form annotated linguistic collocations and keywords associated with the topic (step 912).

Subsequently, the computer receives a new incoming chat utterance during the chat conversation corresponding to the chat users (step 914). The computer performs the corpus linguistic and topic modeling analysis of the new incoming chat utterance to determine linguistic collocations and keywords corresponding to the new incoming chat utterance (step 916). The computer compares the linguistic collocations and keywords corresponding to the new incoming chat utterance to the annotated linguistic collocations and keywords associated with the topic (step 918).

The computer makes a determination as to whether multiple topics appear entangled between the new incoming chat utterance and previous chat utterances based on the comparison (step 920). If the computer determines that multiple topics appear entangled between the new incoming chat utterance and previous chat utterances based on the comparison, yes output of step 920, then the computer calculates an utterance location adjustment score for the new incoming chat utterance using a stochastic partial differential equation (step 922).

Afterward, the computer makes a determination as to whether the utterance location adjustment score for the new incoming chat utterance is statistically significant (step 924). If the computer determines that the utterance location adjustment score for the new incoming chat utterance is not statistically significant, no output of step 924, then the process returns to step 914 where the computer waits to receive another new incoming chat message. If the computer determines that the utterance location adjustment score for the new incoming chat utterance is statistically significant, yes output of step 924, then the computer disentangles the new incoming chat utterance from the previous chat utterances by placing the new incoming chat utterance in a new chat discourse related to a new topic (step 926). Thereafter, the process returns to step 914 where the computer waits to receive another new incoming chat message.

Returning again to step 920, if the computer determines that multiple topics do not appear entangled between the new incoming chat utterance and previous chat utterances based on the comparison, no output of step 920, then the computer the computer makes a determination as to whether the chat conversation corresponding to the chat users has ended (step 928). If the computer determines that the chat conversation corresponding to the chat users has not ended, no output of step 928, then the process returns to step 914 where the computer waits to receive another new incoming chat message. If the computer determines that the chat conversation corresponding to the chat users has ended, yes output of step 928, then the process terminates thereafter.

With reference now to FIG. 10, a flowchart illustrating a process for rearranging chat utterances is shown in accordance with an illustrative embodiment. The process shown in FIG. 10 may be implemented in a computer, such as, for example, server 104 in FIG. 1 or data processing system 200 in FIG. 2. For example, the process shown in FIG. 10 may be implemented in chat manager 218 in FIG. 2.

The process begins when the computer analyzes a real time chat discourse of a group chat conversation corresponding to a plurality of chat users using corpus linguistics and topic modeling to determine linguistic collocations and keywords of multiple chat utterances posted during the real time chat discourse (step 1002). The computer performs an analysis of the linguistic collocations and the keywords of the multiple chat utterances and amount of contribution by respective chat users of the plurality of chat users to the multiple chat utterances to determine a level of drift of the linguistic collocations, the keywords, and respective chat users over a course of the multiple chat utterances (step 1004).

The computer determines chat utterance entanglement of prior chat utterances using the determined level of drift based on the analysis by inferring keyword usage over time and how these keywords are related over the course of the multiple chat utterances (step 1006). The computer disentangles the prior chat utterances related to a particular topic by removing certain chat utterances that have a statistically significant level of drift from that particular topic (step 1008). The computer arranges removed chat utterances having the statistically significant level of drift as a new chat discourse related to a different topic in the group chat conversation (step 1010). Thereafter, the process terminates.

Thus, illustrative embodiments of the present invention provide a computer-implemented method, computer system, and computer program product for determining entanglement of chat utterances corresponding to different chat discourses relating to different topics during an online group chat session between multiple chat users based on analysis of linguistic collocations and keywords identified in the different chat utterances using corpus linguistics and topic modeling and disentangling entangled chat utterances related to the different topics by arranging certain of the entangled chat utterances in a new chat discourse based on an utterance location adjustment score corresponding to each of the certain chat utterances being statistically significant. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for disentanglement of chat utterances, the computer-implemented method comprising:

analyzing, by a computer, a chat discourse of a chat conversation corresponding to a plurality of chat users using corpus linguistics and topic modeling to determine linguistic collocations and keywords of multiple chat utterances posted during the chat discourse;

receiving, by the computer, logins to a group chat session corresponding to the chat conversation from client devices of the plurality of chat users via a network;

receiving, by the computer, the multiple chat utterances posted during the chat conversation corresponding to the plurality of chat users;

performing, by the computer, the corpus linguistics and topic modeling of the multiple chat utterances posted during the chat conversation corresponding to the plurality of chat users;

determining, by the computer, the linguistic collocations and the keywords used over time during the chat conversation based on the corpus linguistics and topic modeling of the multiple chat utterances posted during the chat conversation corresponding to the plurality of chat users;

determining, by the computer, a topic of the chat conversation corresponding to the plurality of chat users based on the linguistic collocations and the keywords used over time;

annotating, by the computer, the linguistic collocations and the keywords for strength of association to the topic to form annotated linguistic collocations and keywords associated with the topic;

receiving, by the computer, a new incoming chat utterance during the chat conversation corresponding to the plurality of chat users;

performing, by the computer, the corpus linguistics and topic modeling of the new incoming chat utterance to determine linguistic collocations and keywords corresponding to the new incoming chat utterance;

comparing, by the computer, the linguistic collocations and keywords corresponding to the new incoming chat utterance to the annotated linguistic collocations and keywords associated with the topic;

determining, by the computer, whether multiple topics appear entangled between the new incoming chat utterance and previous chat utterances based on the comparing;

responsive to the computer determining that multiple topics appear entangled between the new incoming chat utterance and previous chat utterances based on the comparing, calculating, by the computer, an utterance location adjustment score for the new incoming chat utterance using a stochastic partial differential equation;

performing, by the computer, an analysis of the linguistic collocations and the keywords of the multiple chat utterances and amount of contribution by respective chat users of the plurality of chat users to the multiple chat utterances to determine a level of drift of the linguistic collocations, the keywords, and respective chat users over a course of the multiple chat utterances;

determining, by the computer, chat utterance entanglement of prior chat utterances using determined level of drift based on the analysis by inferring keyword usage over time and how these keywords are related over the course of the multiple chat utterances;

disentangling, by the computer, the prior chat utterances related to a particular topic by removing certain chat utterances that have a statistically significant level of drift from that particular topic; and arranging, by the computer, removed chat utterances having the statistically significant level of drift as a new chat discourse related to a different topic in the chat conversation.

2. The computer-implemented method of claim 1 further comprising:
   determining, by the computer, whether the utterance location adjustment score for the new incoming chat utterance is statistically significant; and
   responsive to the computer determining that the utterance location adjustment score for the new incoming chat utterance is statistically significant, disentangling, by the computer, the new incoming chat utterance from the previous chat utterances by placing the new incoming chat utterance in a new chat discourse related to a new topic.

3. The computer-implemented method of claim 1, wherein the chat conversation is a real time group chat conversation between the plurality of chat users.

4. The computer-implemented method of claim 3, wherein the real time group chat conversation is a plurality of real time chat sessions.

5. The computer-implemented method of claim 1 further comprises:
   displaying, by the computer, the chat discourse to new chat users joining the chat conversation.

6. The computer-implemented method of claim 1 further comprises:
   generating, by the computer, a heatmap using the utterance location adjustment score for the new incoming chat utterance.

7. A computer system for disentanglement of chat utterances, the computer system comprising:
   a bus system;
   a storage device connected to the bus system, wherein the storage device stores program instructions; and
   a processor connected to the bus system, wherein the processor executes the program instructions to:
      analyze a chat discourse of a chat conversation corresponding to a plurality of chat users using corpus linguistics and topic modeling to determine linguistic collocations and keywords of multiple chat utterances posted during the chat discourse;
      receive logins to a group chat session corresponding to the chat conversation from client devices of the plurality of chat users via a network;
      receive the multiple chat utterances posted during the chat conversation corresponding to the plurality of chat users;
      perform the corpus linguistics and topic modeling of the multiple chat utterances posted during the chat conversation corresponding to the plurality of chat users;
      determine the linguistic collocations and the keywords used over time during the chat conversation based on the corpus linguistics and topic modeling of the multiple chat utterances posted during the chat conversation corresponding to the plurality of chat users;
      determine a topic of the chat conversation corresponding to the plurality of chat users based on the linguistic collocations and the keywords used over time;
      annotate the linguistic collocations and the keywords for strength of association to the topic to form annotated linguistic collocations and keywords associated with the topic;

receive a new incoming chat utterance during the chat conversation corresponding to the plurality of chat users;

perform the corpus linguistics and topic modeling of the new incoming chat utterance to determine linguistic collocations and keywords corresponding to the new incoming chat utterance;

compare the linguistic collocations and keywords corresponding to the new incoming chat utterance to the annotated linguistic collocations and keywords associated with the topic;

determine whether multiple topics appear entangled between the new incoming chat utterance and previous chat utterances based on the comparing;

calculate an utterance location adjustment score for the new incoming chat utterance using a stochastic partial differential equation in response to determining that multiple topics appear entangled between the new incoming chat utterance and previous chat utterances based on comparing;

perform an analysis of the linguistic collocations and the keywords of the multiple chat utterances and amount of contribution by respective chat users of the plurality of chat users to the multiple chat utterances to determine a level of drift of the linguistic collocations, the keywords, and respective chat users over a course of the multiple chat utterances;

determine chat utterance entanglement of prior chat utterances using determined level of drift based on the analysis by inferring keyword usage over time and how these keywords are related over the course of the multiple chat utterances;

disentangle the prior chat utterances related to a particular topic by removing certain chat utterances that have a statistically significant level of drift from that particular topic; and arrange removed chat utterances having the statistically significant level of drift as a new chat discourse related to a different topic in the chat conversation.

8. The computer system of claim 7, wherein the processor further executes the program instructions to:

determine whether the utterance location adjustment score for the new incoming chat utterance is statistically significant; and disentangle the new incoming chat utterance from the previous chat utterances by placing the new incoming chat utterance in a new chat discourse related to a new topic in response to determining that the utterance location adjustment score for the new incoming chat utterance is statistically significant.

9. The computer system of claim 7, wherein the chat conversation is a real time group chat conversation between the plurality of chat users.

10. The computer system of claim 9, wherein the real time group chat conversation is a plurality of real time chat sessions.

11. The computer system of claim 7, wherein the processor further executes the program instructions to:

display the chat discourse to new chat users joining the chat conversation.

12. The computer system of claim 7, wherein the processor further executes the program instructions to:

generate a heatmap using the utterance location adjustment score for the new incoming chat utterance.

13. A computer program product for disentanglement of chat utterances, the computer program product comprising a computer readable storage medium having program instructions embodied therewith, the program instructions executable by a computer to cause the computer to perform a method of:

analyzing, by the computer, a chat discourse of a chat conversation corresponding to a plurality of chat users using corpus linguistics and topic modeling to determine linguistic collocations and keywords of multiple chat utterances posted during the chat discourse;

receiving, by the computer, logins to a group chat session corresponding to the chat conversation from client devices of the plurality of chat users via a network;

receiving, by the computer, the multiple chat utterances posted during the chat conversation corresponding to the plurality of chat users;

performing, by the computer, the corpus linguistics and topic modeling of the multiple chat utterances posted during the chat conversation corresponding to the plurality of chat users;

determining, by the computer, the linguistic collocations and the keywords used over time during the chat conversation based on the corpus linguistics and topic modeling of the multiple chat utterances posted during the chat conversation corresponding to the plurality of chat users;

determining, by the computer, a topic of the chat conversation corresponding to the plurality of chat users based on the linguistic collocations and the keywords used over time;

annotating, by the computer, the linguistic collocations and the keywords for strength of association to the topic to form annotated linguistic collocations and keywords associated with the topic;

receiving, by the computer, a new incoming chat utterance during the chat conversation corresponding to the plurality of chat users;

performing, by the computer, the corpus linguistics and topic modeling of the new incoming chat utterance to determine linguistic collocations and keywords corresponding to the new incoming chat utterance;

comparing, by the computer, the linguistic collocations and keywords corresponding to the new incoming chat utterance to the annotated linguistic collocations and keywords associated with the topic;

determining, by the computer, whether multiple topics appear entangled between the new incoming chat utterance and previous chat utterances based on the comparing; and responsive to the computer determining that multiple topics appear entangled between the new incoming chat utterance and previous chat utterances based on the comparing, calculating, by the computer, an utterance location adjustment score for the new incoming chat utterance using a stochastic partial differential equation;

performing, by the computer, an analysis of the linguistic collocations and the keywords of the multiple chat utterances and amount of contribution by respective chat users of the plurality of chat users to the multiple chat utterances to determine a level of drift of the linguistic collocations, the keywords, and respective chat users over a course of the multiple chat utterances;

determining, by the computer, chat utterance entanglement of prior chat utterances using determined level of drift based on the analysis by inferring keyword usage over time and how these keywords are related over the course of the multiple chat utterances;

disentangling, by the computer, the prior chat utterances related to a particular topic by removing certain chat utterances that have a statistically significant level of drift from that particular topic; and arranging, by the computer, removed chat utterances having the statistically significant level of drift as a new chat discourse related to a different topic in the chat conversation.

14. The computer program product of claim 13 further comprising:

determining, by the computer, whether the utterance location adjustment score for the new incoming chat utterance is statistically significant; and responsive to the computer determining that the utterance location adjustment score for the new incoming chat utterance is statistically significant, disentangling, by the computer, the new incoming chat utterance from the previous chat utterances by placing the new incoming chat utterance in a new chat discourse related to a new topic.

15. The computer program product of claim 13, wherein the chat conversation is a real time group chat conversation between the plurality of chat users.

16. The computer program product of claim 15, wherein the real time group chat conversation is a plurality of real time chat sessions.

17. The computer program product of claim 13 further comprising:

displaying, by the computer, the chat discourse to new chat users joining the chat conversation.

18. The computer program product of claim 13 further comprising:

generating, by the computer, a heatmap using the utterance location adjustment score for the new incoming chat utterance.

* * * * *